Patented Oct. 29, 1946

2,410,042

UNITED STATES PATENT OFFICE 2,410,042

PURIFICATION OF STYRENE AND ITS HOMOLOGUES

George R. Bond, Jr., Paulsboro, N. J., assignor to Houdry Process Corporation, Wilmington, Del., a corporation of Delaware No Drawing. Application March 31, 1944, Serial No. 528,949

4 Claims. (Cl. 260—669)

The present invention relates to improved methods for the purification of styrene and its homologues produced in the cracking of high boiling hydrocarbon oils.

Heretofore the commercial preparation of compounds having a styrene nucleus has been in accordance with the classical methods, such as molecular dehydration of beta-phenyl ethyl alcohol. Recently dehydrogenation methods have been employed such as the dehydrogenation of ethyl benzene and iso-propyl benzene for the production of styrene and α-methyl styrene, respectively. The purification of the dehydrogenation product of these processes is relatively simple and involves the fractionation of the product to separate the unsaturate from the saturate.

It has heretofore been known in the art that compounds having a styrene nucleus, by which it is intended to include styrene and its homologues, are obtained both in thermal and catalytic cracking of gas oils. The percentage of such materials produced depends in both thermal and catalytic cracking to a substantial extent upon the conditions of cracking, particularly upon the temperature, higher temperatures being conducive to higher yields of styrene and its homologues. Various methods have been proposed for the purification of the styrenes so produced and in general involve fractionation, and concentration by solvent extraction.

I have found that cuts of cracked hydrocarbon oils containing styrenes also contain small percentages of reactive materials which interfere with the customary uses of styrene. These materials also interfere with some of the purification methods employed and in many instances with the production of styrene derivatives. In general, these reactive materials can not readily be separated from the styrene by known purification methods, but remain with the styrene, this being true both in conjunction with fractionation and solvent extraction. An example of the interference of these reactive materials with styrene is found in the preparation of nitrosites of the styrene. When nitric oxide is reacted with the styrene compounds in the hydrocarbon oil the product which is produced is of a dark gummy consistency instead of being in the form of the characteristic light yellow crystals.

Among the objects of the present invention are to provide methods for the purification of styrene compounds produced by cracking of hydrocarbon oils and to free the styrene compounds of highly reactive impurities. Other objects and advantages of the present invention will be apparent as the description proceeds.

In accordance with the preferred form of the present invention a cut of a cracked hydrocarbon oil containing a styrene type compound is purified of the reactive materials by effecting reaction of the impurities in the presence of sulphur dioxide and by separating the high boiling reaction products from the cut.

The cracked hydrocarbon, which is preferably a narrow cut relatively rich in styrene or in a homologue of styrene, is treated with sulphur dioxide. The cut may conveniently be saturated with sulphur dioxide by bubbling the gas through the cut, though obviously liquid phase sulphur dioxide may be added to the cut in limited amount insufficient to leave any liquid phase sulphur dioxide undissolved in the cut. The cut containing dissolved sulphur dioxide is maintained at a temperature below about 130° F. for at least 15 minutes. No catalyst is needed to effect the reaction and it is preferred not to employ any inasmuch as catalysts will generally promote reaction of the sulphur dioxide with styrene type compounds. Temperatures substantially below room temperature are not desirable since the rate of reaction is reduced. Operation at such temperatures though is within the scope of this invention.

The sulphur dioxide treatment causes the formation of a tarry material without any substantial loss of either the styrene materials or the principal olefins present. It is not known definitely what the impurities are which are removed or what the tarry material is, whether a polymer of the highly reactive olefins or a product of interaction of the sulphur dioxide with the highly reactive impurities. It is to be noted that under the conditions of treatment olefins generally do not react to any substantial extent with sulphur dioxide.

Following the sulphur dioxide treatment the tarry material formed from the reactive components is removed from the unreacted materials. Likewise it is desirable to remove unreacted sulphur dioxide. Convenient methods for the removal of these two are to distill the cut, preferably with steam, whereby the tarry material is separated, and to wash the cut either before or after steam distillation with an alkaline wash such as a solution of caustic soda.

When it is desired to separate the styrene from a cracked gasoline the sulphur dioxide treatment may be effected either before or after making a narrow cut of the gasoline, which cut contains the desired styrene components. In the case of styrene itself the cut will ordinarily contain styrene, ethyl benzene, xylene, and the paraffins, naphthenes and less reactive olefins which boil in substantially the styrene range. By solvent extraction the paraffins and naphthenes may be separated so that the fraction contains styrene, ethyl benzene, xylene and the less reactive olefins. By close fractionation it is possible to obtain a relatively pure styrene. The sulphur dioxide treatment may be employed at any stage in the preparation, though it is preferred to treat the relatively narrow cut prior to solvent extraction.

A 120° to 150° C. cut of a naphtha obtained by thermal cracking of gas oil was saturated with sulphur dioxide by bubbling the sulphur dioxide through the cut at room temperature. The cut so saturated was allowed to stand for one hour at room temperature. It was then washed with caustic solution to remove free sulphur dioxide and steam distilled. A dark red gummy residue was left following the distillation. A sample of the cut prior to $SO_2$ treatment was saturated with nitrogen trioxide at room temperature to form the nitrosite of the styrene. This produced a nitrosite which was a dark reddish brown oily precipitate. The yield of nitrosite after alcohol purification showed the naphtha contained 25.5% styrene. Following $SO_2$ purification of the original cut a nitrosite was formed by the same method, which nitrosite was a relatively pure, pale yellow crystalline precipitate which was easily filtered. The yield of nitrosite showed that the naphtha after treatment contained 25.1% styrene. The difference in the indicated styrene content was probably due to the difficulty of purification of the oily nitrosite.

What I claim is:

1. The method of purifying a hydrocarbon oil containing a styrene compound, which hydrocarbon oil was produced by cracking a gas oil, which comprises dissolving sulphur dioxide in the hydrocarbon oil, maintaining the oil with the sulphur dioxide dissolved therein at a temperature below 130° F. for at least 15 minutes in the absence of undissolved liquid phase sulphur dioxide, whereby reactive impurities are caused to react to form a high boiling reaction product and separating the reaction product and excess sulphur dioxide from the hydrocarbon oil.

2. The process of purifying a crude styrene compound produced by the cracking of a higher boiling hydrocarbon oil resulting in the compound containing reactive impurities, which comprises dissolving sulphur dioxide in the compound, maintaining sulphur dioxide dissolved in said compound for a period of at least 15 minutes at a temperature below about 130° F. in the absence of undissolved liquid phase sulfur dioxide, whereby the reactive impurities are caused to react to form a high boiling reaction product, and separating the reaction product from the compound.

3. The process of purifying cracked naphtha of highly reactive impurities which comprises dissolving sulphur dioxide in the naphtha, maintaining the naphtha together with dissolved sulphur dioxide at a temperature below about 130° F. for at least about 15 minutes in the absence of liquid phase sulphur dioxide and in the absence of a catalyst whereby the reactive impurities are caused to react to form a high boiling reaction product, and separating the reaction product from the naphtha by distillation.

4. The method of purifying a hydrocarbon oil containing a styrene compound, which hydrocarbon oil was produced by cracking a gas oil, which comprises dissolving sulphur dioxide in the hydrocarbon oil, maintaining the oil with the sulphur dioxide dissolved therein at a temperature below 130° F. for at least 15 minutes in the absence of liquid phase sulphur dioxide undissolved in the oil, whereby reactive impurities are caused to react to form a high boiling reaction product and separating the reaction product and excess sulphur dioxide from the hydrocarbon oil.

GEORGE R. BOND, JR.